United States Patent
Yonker et al.

(10) Patent No.: US 8,214,139 B2
(45) Date of Patent: Jul. 3, 2012

(54) POSITION SOURCE SELECTION

(75) Inventors: Jason B. Yonker, Lee's Summit, MO (US); Mei-Lin Hsieh, Phoenix, AZ (US); Bernhard P. Weisshaar, Phoenix, AZ (US); Haitao Huang, Gilbert, AZ (US); Merlin J. Smith, Chandler, AZ (US)

(73) Assignee: Garmin Switzerland GmbH (CH)

( * ) Notice: Subject to any disclaimer, the term of this patent is extended or adjusted under 35 U.S.C. 154(b) by 1043 days.

(21) Appl. No.: 12/146,035

(22) Filed: Jun. 25, 2008

(65) Prior Publication Data

US 2009/0192709 A1 Jul. 30, 2009

Related U.S. Application Data

(60) Provisional application No. 61/023,585, filed on Jan. 25, 2008, provisional application No. 61/027,204, filed on Feb. 8, 2008.

(51) Int. Cl.
*G01C 21/16* (2006.01)

(52) U.S. Cl. ........ 701/215; 701/207; 701/214; 701/216

(58) Field of Classification Search .................. 701/215, 701/207, 214, 216
See application file for complete search history.

(56) References Cited

U.S. PATENT DOCUMENTS

| | | | | |
|---|---|---|---|---|
| 5,602,903 A | 2/1997 | LeBlanc et al. | | 379/60 |
| 5,982,324 A | 11/1999 | Watters et al. | | 342/357.06 |
| 6,141,570 A | 10/2000 | O'Neill, Jr. et al. | | 455/574 |
| 6,157,841 A | 12/2000 | Bolduc et al. | | 455/456 |
| 6,249,245 B1 | 6/2001 | Watters et al. | | 342/357.03 |
| 6,317,605 B1 | 11/2001 | Sakuma | | 455/457 |
| 6,433,735 B1 | 8/2002 | Bloebaum et al. | | 342/357.1 |
| 6,801,159 B2* | 10/2004 | Swope et al. | | 342/357.31 |
| 6,853,840 B2 | 2/2005 | Najafi | | 455/410 |
| 6,928,292 B2 | 8/2005 | Tsunehara et al. | | 455/456.1 |
| 7,215,967 B1 | 5/2007 | Kransmo et al. | | 455/456.2 |
| 2002/0115436 A1* | 8/2002 | Howell et al. | | 455/426 |
| 2003/0179134 A1* | 9/2003 | Lampert et al. | | 342/357.14 |
| 2006/0247854 A1* | 11/2006 | Esaki et al. | | 701/210 |
| 2009/0149200 A1* | 6/2009 | Jayasinghe et al. | | 455/456.3 |

FOREIGN PATENT DOCUMENTS

| | | |
|---|---|---|
| JP | 10-038993 | 2/1998 |
| JP | 2002-281540 | 9/2002 |
| JP | 2004-233058 | 8/2004 |

(Continued)

OTHER PUBLICATIONS

Accuracy of Location Data; Google Mobile™ Mobile Help Center; published prior to Jun. 25, 2008.

(Continued)

*Primary Examiner* — Mark Fadok
(74) *Attorney, Agent, or Firm* — Samuel M. Korte

(57) ABSTRACT

Techniques are described for position source selection. In an implementation, an electronic device provides a variety of functionality including at least functionality to determine position. The electronic device may be further configured to select between a plurality of position sources to determine position based upon a variety of selection criteria. In an implementation, a last known position may be stored when position is being determined through the plurality of position sources. The last known position may be used as an alternative to determining position via the position sources when one or more of the position sources are unavailable. In another implementation, the last known position may be employed to automatically select one of the plurality of position sources to be used by the electronic device for determining position.

17 Claims, 5 Drawing Sheets

FOREIGN PATENT DOCUMENTS

| | | |
|---|---|---|
| KR | 10-2000-0037429 | 7/2000 |
| KR | 10-0658152 | 12/2006 |

OTHER PUBLICATIONS

A-GPS Explained in Historical Context; GPS-practice-and-fun.com; published prior to Jun. 25, 2008.

Cellular Network Optimisation Based on Mobile Location; CELLO Consortium: VTT Information Technology, Cosmote Mobile Telecommunications S.A., Center for PersonKimmunikation, Elisa Communications Corporation, Motorola S.p. A, Institute of Communication and Computer Systems, Teleplan AS; 2001.

* cited by examiner

POSITION SOURCE SELECTION

RELATED APPLICATIONS

This Application, under the provisions of 35 U.S.C. §119 (e), claims the benefit of and priority to U.S. Provisional Application Ser. No. 61/023,585, filed Jan. 25, 2008, entitled "Method and Apparatus for Using Location Information to Select a Location-Determining Method" and U.S. Provisional Application Ser. No. 61/027,204, filed Feb. 8, 2008, entitled "Method and Apparatus for Acquiring Last Known Position" the disclosures of which are incorporated herein by reference in their entirety.

BACKGROUND

Portable electronic devices including navigation devices are becoming increasingly more popular. Navigation devices typically include location determining components, such as satellite navigation receivers, and processing elements operable to provide navigation information such as desired routes of travel from current geographic locations to desired geographic locations. Traditionally, electronic devices including navigation devices were configured as single function devices, such as a mobile phone limited to phone service, an audio player limited to playing music, and a navigation device limited to position-determining functionality and so on.

However, as the popularity of portable electronic devices has increased, manufacturers have responded by developing cross-functional devices to provide multiple functions. Thus, enhanced navigation devices may be configured to provide a wide range of functions and applications, only some of which are location-oriented. For instance, a navigation device may provide a combination of position-determining functionality, mobile phone service, Internet capability and so on. Further, a navigation device may be configured to utilize more than one position-determining technique to determine its geographic locations.

When used for navigation activities, it is likely that a navigation device will use the most accurate and current position. Thus, it makes sense at such times to keep the satellite navigation receiver powered up and active since the satellite navigation receiver may be used often during navigation activities. At other times, such as when the navigation device is used for other activities, when the device is used indoors, or while the device is stationary for a long period of time, accurate position information may be less important. However, traditional satellite navigation receivers for navigation devices are configured to continue attempts to obtain position regardless of how and where the device is used, which causes discharge of the battery power at a relatively high rate.

SUMMARY

Techniques are described for position source selection. In an implementation, an electronic device provides a variety of functionality including at least functionality to determine position. The electronic device may be further configured to select between a plurality of position sources to determine position based upon a variety of selection criteria. In an implementation, a last known position may be stored when position is being determined through the plurality of position sources. The last known position may be used as an alternative to determining position via the position sources when one or more of the position sources are unavailable. In another implementation, the last known position may be employed to automatically select one of the plurality of position sources to be used by the electronic device for determining position.

This Summary is provided solely to introduce subject matter that is fully described in the Detailed Description and Drawings. Accordingly, the Summary should not be considered to describe essential features nor be used to determine scope of the claims.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
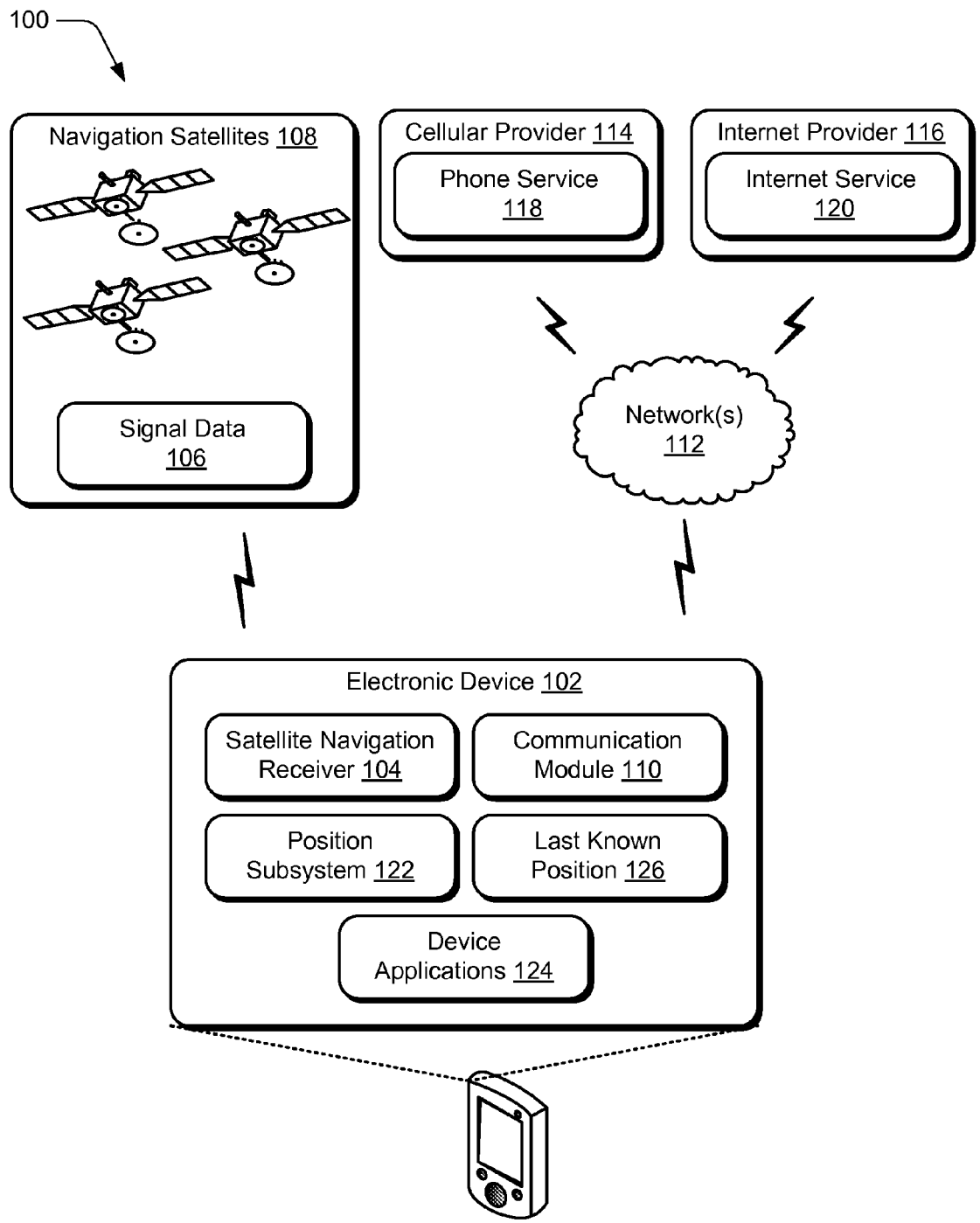
FIG. 1 depicts an exemplary environment in which position source selection techniques may be employed.

As the popularity of portable electronic devices has increased, manufacturers have responded by developing cross-functional devices that provide multiple functions. Thus, a portable electronic device may be configured to provide a wide range of functions for a wide range of applications, such as a navigation device providing a combination of position-determining functionality, mobile phone service, internet capability, and so forth. Further, a navigation device may be configured to utilize more than one position-determining technique to determine position.

Techniques are described for position source selection. In an implementation, an electronic device provides at least functionality to determine position. The electronic device may further include a position subsystem to intelligently select between a plurality of position sources to determine position. For example, the position subsystem may initiate a satellite navigation receiver to determine position through signal data from a plurality of navigation satellites responsive to receiving a request for position information from a device application. If satellite navigation is unavailable, the position subsystem may select a different position source such as by using a cellular provider/network to perform cellular triangulation. In an implementation, a hierarchy of position sources may be defined that arranges different position sources on a relative scale according to a preferred order of selection or priority of use. Thus, the position subsystem may use the defined hierarchy to select a best available position source. A variety of other selection criteria are contemplated by which position subsystem may select a position source.

In an implementation, the position subsystem may store a last known position when position is being determined through the plurality of position sources. Then, the position subsystem may provide the last known position to position dependent applications when one or more of the position sources are unavailable. For example, while a user is driving home from work the position subsystem may periodically update a last known position. When the user arrives at home and goes inside with the electronic device, satellite navigation may be unavailable as long as the user remains indoors. Thus, the position subsystem may provide the most recent last known position data to fulfill a request for position from a position dependent application of the electronic device as an alternative to using the satellite navigation. For example, a search application may be provided with the last known position to perform a search for points of interest (POIs) when the electronic device is indoors. Use of last known position may additionally increase the responsiveness of applications, such as search applications, by enabling the applications to quickly provide information when the satellite navigation receiver in the process of acquiring satellite signals.

In the following discussion, an exemplary environment and devices are first described that are operable to perform automatic device mode switching techniques. Exemplary procedures are then described that may be employed with the exemplary environment and devices, as well as with other environments and devices without departing from the spirit and scope thereof.

Exemplary Environment

FIG. 1 illustrates an implementation of an environment 100 in which techniques for position source selection may be employed. In the depicted example, the environment 100 includes an electronic device 102. Electronic device 102 may be configured to provide a variety of functionality through various applications, components, modules, and operational modes of the electronic device 102. A variety of electronic devices 102 suitable to provide the variety of functionality are contemplated. For instance, an electronic device 102 may be configured as devices including, but not limited to: a mobile phone; a navigation device; a portable computer; a personal digital assistant; a multimedia device; a game device; and/or combinations thereof. In the following description a referenced component, such as electronic device 102, may refer to one or more entities, and therefore by convention reference may be made to a single entity (e.g., the electronic device 102) or multiple entities (e.g., the electronic devices 102, the plurality of electronic devices 102, and so on) using the same reference number.

In an implementation, electronic device 102 includes functionality to determine position. For example, electronic device 102 is depicted as including a satellite navigation receiver 104 that represents functionality to receive signal data 106 from navigation satellites 108. Satellite navigation receiver 104 may be configured in a variety of ways such as a global positioning system (GPS) receiver, a GLONASS receiver, a Galileo receiver, or other satellite navigation receiver.

Electronic device 102 also includes a communication module 110 representative of communication functionality to permit electronic device 102 to send/receive data between different devices (e.g., components/peripherals) and/or over the one or more networks 112. Communication module 110 is representative of a variety communication components and functionality including, but not limited to: one or more antennas; a browser; a transmitter; a receiver; a wireless radio; data ports; software interfaces and drivers; networking interfaces; data processing components; and so forth.

The one or more networks 112 are representative of a variety of different communication pathways and network connections which may be employed, individually or in combination, to communicate among the components of the environment 100. Thus, the one or more networks 112 may be representative of communication pathways achieved using a single network or multiple networks. Further, the one or more networks 112 are representative of a variety of different types of networks and connections including but not limited to: the Internet; an intranet; a satellite network; a cellular network; a mobile data network; wired and/or wireless connections; and so forth. Examples of wireless networks include but are not limited to networks configured for communications according to: one or more standard of the Institute of Electrical and Electronics Engineers (IEEE), such as 802.11 or 802.16 (Wi-Max) standards; Wi-Fi standards promulgated by the Wi-Fi Alliance; Bluetooth standards promulgated by the Bluetooth Special Interest Group; and so on. Wired communications are also contemplated such as through universal serial bus (USB), Ethernet, serial connections, and so forth.

For example, electronic device 102 (through functionality represented by the communication module 110) may be configured to communicate via one or more networks 112 with a cellular provider 114 and/or an internet provider 116 to receive phone service 118 and Internet service 120 respectively. Internet service 120 may represent a variety of different types of content/services, examples of which include but are not limited to web pages, location services, web services, music, video, email service, instant messaging and so forth. While illustrated separately, internet service 120 and phone service 118 may be provided by through a common provider. For example, cellular provider 114 may provide both phone service 118 and internet service 120.

As noted, electronic device 102 may be configured to determine position. More particularly, electronic device 102 may include a position subsystem 122 that is configured to manage, use, and selectively switch between a variety of positions sources and/or position-determining techniques to determine a geographic position of the electronic device 102. For instance, position subsystem 122 may manage and process signal data 106 received from the GPS satellites 108 via the Satellite navigation receiver 104. The electronic device 102 may receive signal data 106 transmitted by one or more position data platforms and/or position data transmitters, examples of which are the depicted as the GPS satellites 108. The position subsystem 122 is representative of functionality operable to determine a geographic position through processing of the received signal data 106. The signal data 106 may include various data suitable for use in position determination, such as timing signals, ranging signals, ephemerides, almanacs, and so forth. Thus, position subsystem 122 may manage and process signal data 106 from GPS satellites 108 to provide a variety of position-determining functionality.

In addition to determining position through the GPS system as described, it should be apparent that a wide variety of other positioning systems may also be employed, such as terrestrial based systems (e.g., wireless-phone based systems such as A-GPS that determine position data from cellular towers, such as through phone service 118), wireless networks that transmit positioning signals, and so on. For example, positioning-determining functionality may be implemented through use of a server in a server-based architecture, from a ground-based infrastructure, through one or more sensors (e.g., gyros, odometers, and magnetometers), use of "dead reckoning" techniques, and so on. The position subsystem 122 may also be configured to selectively switch between a variety of position-determining techniques that may be available through different position sources. Thus, in addition to using the GPS satellites 108, the position subsystem 122 of the example electronic device 102 in FIG. 1 may also determine position through the cellular service 118 and/or Internet service 120. Further discussion of a position subsystem 122 operable to switch between a variety of position-determining techniques and/or position sources may be found in relation to FIG. 2.

The electronic device 102 may include a variety of device applications 124 which may be configured to provide a wide range of functionality to the electronic device 102. The position subsystem 122 may be operable to provide a determined position and/or other position data to the various device applications 124 to enable position dependent functionality. Position dependent functionality may include but is not limited to: indicating geographic position on a map; tracking speed and distance; weather service; traffic service; providing navigation instructions; providing trip data; conducting position based point of interest (POI) searches, database searches, and/or internet searches; and so forth.

In accordance with position source selection techniques described herein, the position subsystem 122 may also determine, store, and manage a last known position (LKP) 126 for the electronic device 102 as depicted in FIG. 1. The LKP 126 represents data stored to enable position dependent functionality when position sources that the electronic device 102 might otherwise use to determine position are unavailable. This may be when the device is unable to connect to one or more position sources or when the device is in the process of acquiring signals from one or more position sources. For instance, GPS techniques may not be available indoors and GPS techniques may take several seconds—or even minutes—to determine initial outdoor positions. Thus, the position subsystem 122 may be configured to update the LKP 126 using the various position sources and/or position determining techniques at times when corresponding position sources are available. The LKP 126 may be employed to provide applications with the best available position information regardless of the device's ability to obtain position using GPS or other techniques. Thus, the LKP 126 may represent the best available position data chosen from available position sources. The LKP 126 may be maintained by the position subsystem 122 and may be used as an alternative to other position determining techniques and/or position sources. LKP 126 may be used to intelligently manage operation of an electronic device 102. Further discussion of selectively using LKP and/or different position sources to intelligently manage operation of an electronic device 102 may be found in relation to the following figures.

Figure 2:
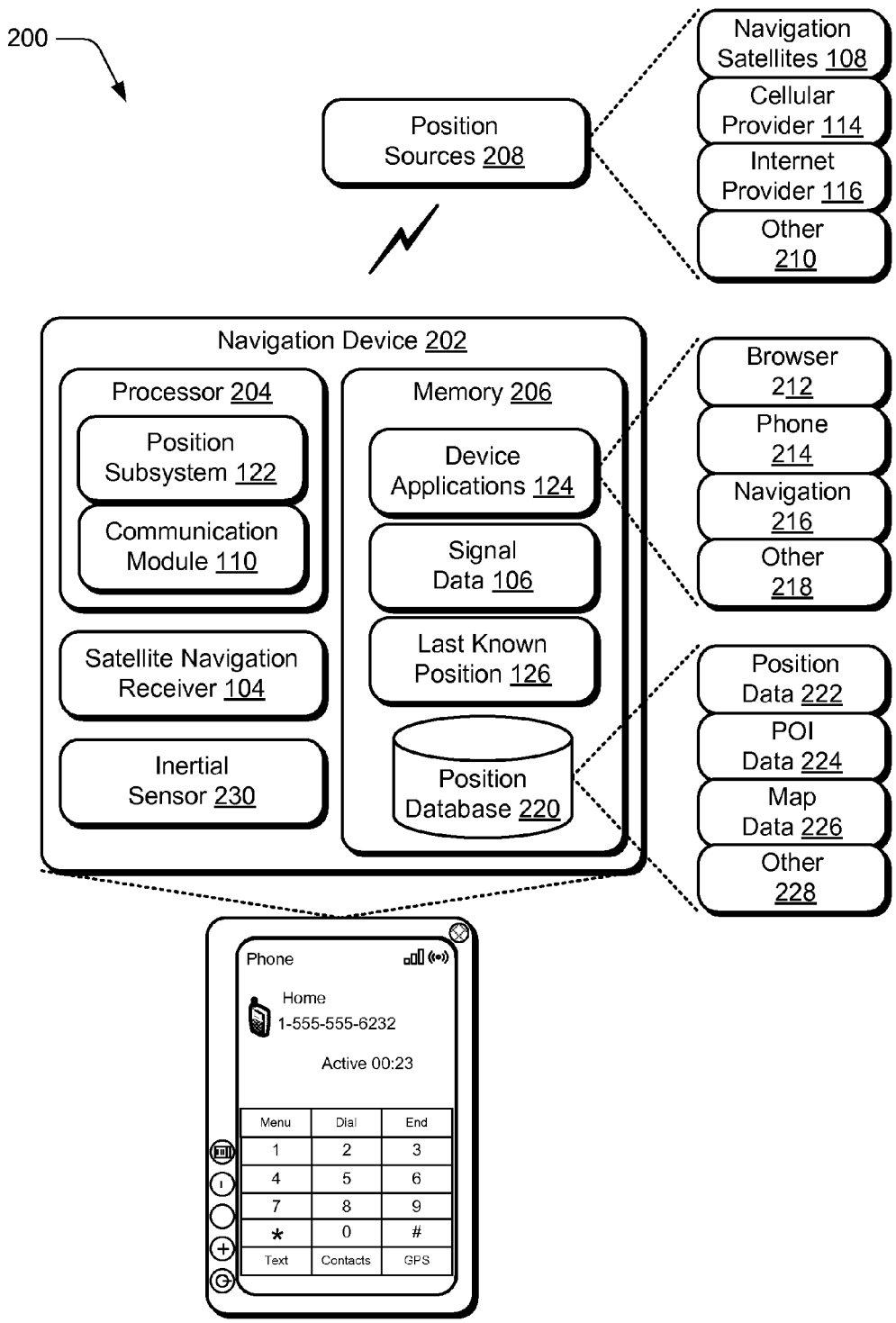
FIG. 2 depicts an exemplary implementation of a navigation device to perform position source selection techniques.

FIG. 2 depicts an implementation 200 of an example of electronic device 102 of FIG. 1 in greater detail. In particular, an example electronic device 102 of FIG. 1 is illustrated as a navigation device 202. The example navigation device 202 of FIG. 2 is illustrated as including a processor 204 and memory 206 that may be utilized to provide a variety of processing and storage capabilities. The navigation device 202 may include at least functionality to determine position. In addition, the navigation device 202 be configured in a variety of way such as mobile phone (as shown); a portable computer; a personal digital assistant; a multimedia device; a game device; and/or combinations thereof Processor 204 is not limited by the materials from which it is formed or the processing mechanisms employed therein, and as such, may be implemented via semiconductor(s) and/or transistors, microprocessors, microcontrollers, programmable intelligent computers (PICs), or the like. The processor 204 may also include field-programmable gate arrays (FPGAs), or other programmable logic devices (PLDs), fully-custom or semi-custom application-specific integrated circuits (ASICs), or any other device that is described by one or more code segments of a hardware description language (HDL). Further, the processor 204 may include combinations of any of the components listed. Additionally, although a single memory 206 is shown for the navigation device 202, a wide variety of types and combinations of memory may be employed, such as random access memory (RAM), hard disk memory, removable medium memory (e.g., the memory 206 may be implemented via a slot that accepts a removable memory cartridge), and other types of computer-readable media.

In the example navigation device 202 of FIG. 2, the position subsystem 122, and communication module 110 are illustrated as modules that are executed via processor 204 and are also storable in the memory 206. It is noted generally that any of the functions described herein can be implemented using software, firmware, hardware (e.g., fixed logic circuitry), manual processing, or a combination of these implementations. The terms "module" and "functionality" as used herein generally represent software, firmware, hardware or a combination thereof. In the case of a software implementation, for instance, the module represents executable instructions that perform specified tasks when executed on a processor, such as the processor 204 with the navigation device 202 of FIG. 2. The program code can be stored in one or more computer-readable media, an example of which the memory 206 associated with the navigation device 202 of FIG. 2.

The navigation device 202 may establish communication connections to various position sources 208. Position sources 208 are representative of sources through which navigation device 202 may determine position and/or receive other content and services. As noted, the position subsystem 122 may be configured to selectively switch between a variety of position sources 208 and corresponding position-determining techniques. In FIG. 2, position sources 208 are illustrated as including satellite navigation satellites 108 such as GPS satellites, cellular provider 114, and Internet provider 116. Thus, navigation device 202, and in particular position subsystem 122, may be configured to use the various position sources 208 to determine position. More particularly, navigation device 202 may determine position using signal data 106 from the satellite navigation satellites 108; through Wi-Fi (802.11) triangulation and/or Wi-Fi hotspot identification via Internet provider 116 and associated Internet service 120; through cellular tower identification and/or triangulation via the cellular provider 114 and associated phone service 118. A variety of other position sources 208 and corresponding position determining techniques are also contemplated.

Memory 206 is illustrated a storing various device applications 124, signal data 106 that may be received via the satellite navigation receiver 104 and last known position 126. The device application 124 are illustrated as including a browser 212, a phone 214 application, and a navigation 216 application. The browser 212 represents functionality executable on the processor 204 to interact with content 120 from an Internet provider 116, such as to obtain email service, send/receive instant messaging, view web pages, download video programs or other content 120, and so forth. Phone 214 application represents functionality executable on the processor 204 to obtain phone service 118 from a cellular provider 114, such as to make and receive mobile phone calls, manage contacts, create/send/receive text messages and so on.

Navigation 216 application represents functionality executable on the processor 204 to provide a variety of navigation functionality. For example, the navigation 216 application may be configured for outdoor navigation, vehicle navigation, aerial navigation (e.g., for airplanes, helicopters), marine navigation, personal use (e.g., as a part of fitnessrelated equipment), and so forth. The Navigation 216 application, for instance, may be executed to use signal data 106 received via the satellite navigation receiver 104 to generate navigation instructions (e.g., turn-by-turn instructions to an input destination), show a current position on a map, and so on. The Navigation 216 application may also be executed to provide other navigation functionality, such as to determine a current speed, calculate an arrival time, and so on.

A variety of other 218 applications may also be included provide additional functionality to the navigation device 202. Other 218 applications may include but are not limited to media applications, games, database, productivity suite, an operating system, drivers, desktop applications, device specific applications, and so forth. Thus, device applications 124 represent a wide variety of functionality that may be operable on the example navigation device 202.

Navigation device is further illustrated as including a position database 220. Position database 220 is representative of a variety of data that may be maintained locally on a navigation device 202 to enable various position-determining techniques and/or navigation functionality. Examples of data that may be maintained in a position database 220 include but are not limited to: position data 222, point of interest (POI) data 224, and map data 226. A variety of other data 228 is also contemplated. Position data 222 is representative of various cached position data such as data relating identifiers of communication infrastructure elements (e.g., cellular towers, Wi-Fi hot spots, radio towers, beacons, and so forth) to position, various communications infrastructure attributes; historical position data; routes and patterns; position source selection criteria including location criteria and other criteria, and so forth. POI data 224 represents data describing various places such as businesses, offices, parks, and so forth that users of the navigation device 202 may be interested in, e.g., points of interest (POIs). POI data 224 may be used to locate various types of POIs, such as through displaying hotels, restaurants, fuel, ATMs and so forth on a map and/or providing instructions to navigate to various POIs. Map data 226 represents various types of maps (e.g., road, topographic, hybrid, satellite) and related data that may be used by navigation device 202 to provide various position-determining techniques and/or navigation functionality, such as showing position on a map, calculating turn-by-turn navigation instructions, display of POIs, and so on.

While position database 220 is illustrated as stored locally on navigation device 202, it is contemplated that portions of the data may be maintained in a remote storage location, such as via a data service provided by the cellular provider 114 or internet provider 116. Navigation device 202 may interact with the remote storage location to perform updates of data maintained locally in the position database 220. In addition to or in lieu of maintaining data locally in a position database 220, navigation device 202 may use portions of the data represented by position database 220 directly for a remote storage location, e.g., without maintaining the data in local storage. For instance, cellular provider 114 may maintain a cellular tower reference database accessible to the navigation device to obtain data relating cell tower ids to position. Similarly, internet provider 116 may maintain a Wi-Fi access point database accessible to the navigation device to obtain data Wi-Fi hot spot identifiers to position. A variety of other examples are also contemplated.

Example navigation device 202 may further include one or more inertial sensors 230 that represent functionality to determine various movement and manual manipulation of the navigation device 202. Inertial sensors 230 may be configured in a variety of ways to provide signals to enable detection of different movements/manipulation of the navigation device 202 including but not limited to detecting orientation, distance, motion, speed, impact, and so forth. For example, the depicted inertial sensor 230 is representative of various components used alone or in combination to detect movements/manipulation, including but not limited to an accelerometer, gyroscopes, velocimeter, tilt sensors, compasses, capacitive or resistive touch sensor, and so on. Inertial sensor 230 may enable a determination of when a stored LKP 126 is valid or invalid. The LKP 126 and its validity may be used to both activate a satellite navigation receiver 104 in anticipation of user activity, thereby enhancing response time of the electronic device 102 and/or to provide location-based services in the absence of GPS or other position sources 208.

For instance, when significant movement or change in position has been detected through inertial sensor 230, this may initiate an update to LKP 126 through one or more position sources 208. Further, the detected movement or change in position may cause switching between different position determining techniques and/or position sources 208. For example, position subsystem 122 may switch from using stored LKP 126 to actively obtaining position through GPS satellites 108 when significant movement or change in position has been detected through the inertial sensor 230. In this manner, the position subsystem 122 may anticipate changes to provide faster response time. A variety of other examples are also contemplated. Further discussion of these and other features of a position subsystem 122 may be found in relation to the following procedures.

Exemplary Procedures

The following discussion describes techniques for position source selection that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference may be made to the environment 100 of FIG. 1 and the example navigation device of FIG. 2. The features of techniques described below are platform-independent, meaning that the techniques may be implemented on a variety of commercial computing platforms having a variety of processors.

Figure 3:
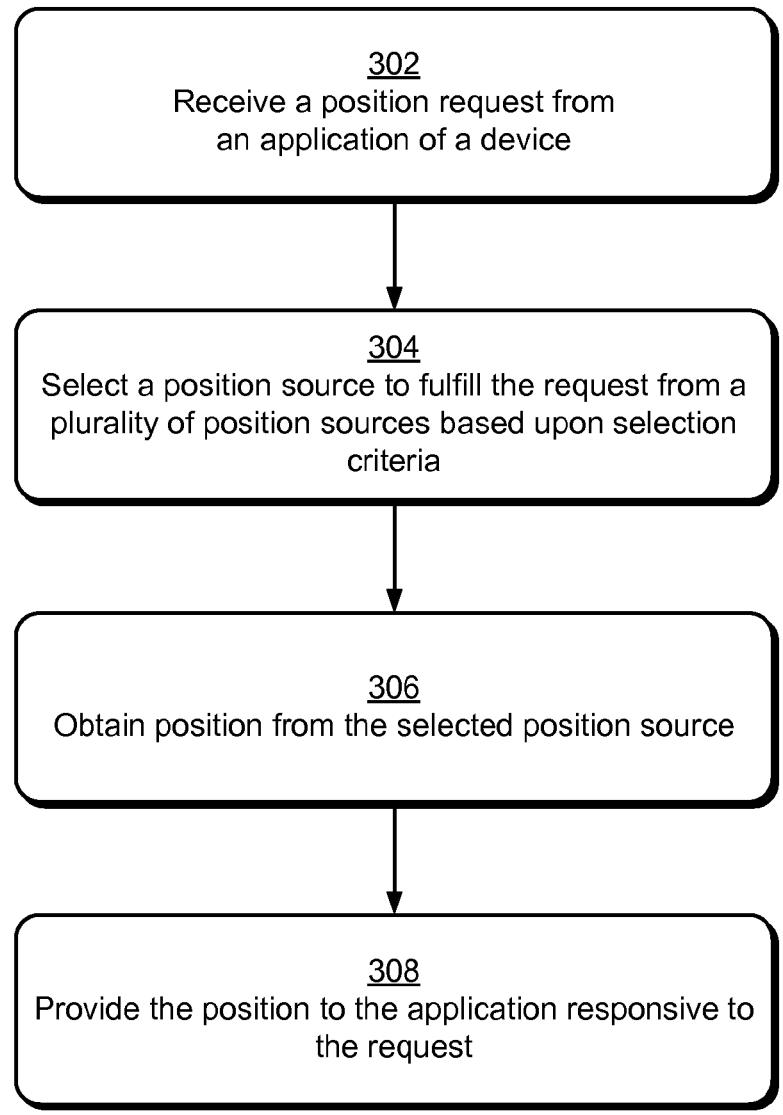
FIG. 3 is a flow diagram depicting an exemplary procedure in which a position source may be selected based upon selection criteria.

FIG. 3 depicts a procedure 300 in an exemplary implementation in which a position source to determine position is selected. A position request is received from an application of a device (block 302). For example, a request for position may be formed by the variety of device applications 124 of the navigation device 202 of FIG. 2. Such requests may be communicated from the device applications 124 to the position subsystem 122 which processes the requests. For instance, navigation 216 application may request a position from position subsystem 122 in order to generate turn-by-turn navigation instructions for output via the navigation device 202. A variety of other examples are also contemplated. Accordingly, position subsystem 122 may receive and process various requests for position from device applications 124.

A position source is selected to fill the request from a plurality of position sources based upon selection criteria (block 304). For instance, navigation device 202 may be configured to determine position using a plurality of position sources 208 as discussed with respect to FIG. 2. In an implementation, navigation device 202 may select between position sources 208 including at least GPS satellites 108, cellular provider 114, and internet provider 116. Further, the navigation 202 may also be configured to store and use last known position (LKP) 126 as an alternative to position determining through the position sources 208.

Navigation device 202 through the position subsystem 122 is configured to select a position source according to various selection criteria. Through various selection criteria, the position subsystem 122 may determine a current context of the navigation device 202. For example, position subsystem 122 uses the selection criteria to understand such things as how and where the navigation device 202 is being used, frequency of use, available power/battery life, available position sources 208, and so forth. Further, a request for position received by a device application 124 may specify additional selection criteria such as preferred/required position sources, frequency to provide position, a position accuracy level, and so forth. Based upon the selection criteria, the position subsystem 122 selects an appropriate position source 208 and corresponding position determining technique to provide the requested position. Further examples regarding selection criteria that may be used to select a position source 208 may be found in the following discussion.

Once a position source has been selected, position is obtained from the selected position source (block 306). For example, position subsystem 122 may select GPS satellites 108 as the selected position source. In this example, the position subsystem 122 may activate the satellite navigation receiver 104 if it is currently inactive. Then, position is obtained using GPS techniques. The obtained position is provided to the application responsive to the request (block 308). Continuing the preceding example, the position subsystem 122 may provide position determined through GPS techniques to the navigation 216 application to enable output of turn-by-turn navigation instructions.

Returning now to various selection criteria, selection of a position source 208 by position subsystem 122 may be based at least in part on a previously determined position. Selection criteria indicative of a previously determined position may include stored position data 222 and/or a last known position 126. Thus, selection criteria may include various location criteria which may be stored as position data 222 in the position database 220 or otherwise in memory 206. The position subsystem 122 may be configured to use at least location criteria to select a position source 208 and corresponding position determining technique. Location criteria may be acquired through interaction with one or more of the position sources 208. Examples of location criteria include but are not limited to the current position of the navigation device 202, the speed of the navigation device 202, a distance traveled by the navigation device 202, general activity of the navigation device 202, frequency of user interaction with the navigation device, movement of the navigation device, and combinations thereof. For example, satellite navigation may be selected if the device has a speed greater than a set amount (e.g., 10 MPH) or if the device has moved more than a threshold distance (e.g., 1 km). Cellular based techniques may be used if the device has a speed less than the set amount or if device is moving within the threshold distance. Additional examples may be found in the following discussion. Such location criteria may be acquired through interaction with one or more of the position sources 208.

Selection criteria, in addition to location criteria, may further include such information as: a position accuracy; priority of position sources 208; availability of position sources 208; power consumption criteria; data from inertial sensor(s) 230; previously recorded position history and patterns data; device configuration data; user profile data; and combinations thereof. Selection criteria may also include a defined hierarchy of the position sources 208. For instance, the hierarchy may arrange position sources 208 according to accuracy, user preferences, priority, power consumption, and so forth. Based on the hierarchy, position subsystem 122 may determine a best available one of position source 208. As noted, at least some of the selection criteria may be received as part of a request for position from a device application 124.

Selection of a position source 208 may be inclusive of selecting a frequency at which to determine position. Thus, not only may the position subsystem 122 select a position source 208 to be used, position subsystem 122 may use the selection criteria to determine how often to determine position. For instance, when a navigation device 202 is being used to navigate, the position may be determined relatively frequently. However, when the navigation device 202 is used at home to access internet service 120, updates to position may occur relatively infrequently as the position subsystem 122 through the selection criteria understands how and where the device is being used. Adjusting the frequency of determining position in this manner may achieve greater power savings.

Selection of a position source 208 may occur responsive to a position request as previously discussed and/or may be initiated in a variety of other ways. In an implementation, selection of a position source 208 by position subsystem 122 may occurs preemptively to speed response time when a request for position from an application is received. In other words, the position subsystem 122 may be configured to proactively select a position source 208 without waiting until a request for position is received. For example, motion detected through inertial sensor 230 may trigger position subsystem 122 to initiate a selection of a position source 208, active a navigation receiver 104 or communication module 110, and/or otherwise take action to switch between position sources 208. In another example, low battery life may trigger position subsystem 122 to deactivate navigation receiver 104 and switch to using cellular of Wi-Fi techniques to determine position. In yet another example, a check of the validity of a stored LKP 126 may cause position subsystem 122 to initiate selection of a position source 208. A variety of other examples are also contemplated. Thus, in addition to or in lieu of selecting a position source 208 responsive to a request, various selection criteria described herein may also be employed by the position subsystem 122 to proactively select a position sources 208.

Thus, responsive to a position request or otherwise, selection criteria (including location criteria and/or other selection criteria) may be employed by the position subsystem 122 to activate or deactivate one or more of the position sources 208, change the frequency at which the navigation device 202 determines its position, store and/or switch to using LKP 126 for position, and so forth. Managing selection of position sources and determining techniques in this manner may provide improved battery life, improved continuity of position dependent function, better response time, and improved location tracking. To further illustrate, some examples of position source selection techniques are now described. In an implementation, the techniques of these examples may be performed using a position subsystem 122 provided as a component of the electronic device 102 or navigation device 202, or equivalent functionality.

Position source selection may be based at least in part on availability of position sources 208. Thus, when one position source 208 is unavailable, the position subsystem 122 may select another position source 208. For example, if a navigation device 202 is traveling through an urban canyon, GPS reception may be lost. In this case, position subsystem 122 may automatically enable Wi-Fi or cellular techniques to determine position. Such selection may be according to a defined hierarchy of the position sources 208 as previously described. The selection may occur transparently to a user, e.g., automatically and without user input. Thus, position subsystem 122 may provide continuity of position functionality through multiple position sources while decreasing chances of interruptions due to the availability of a single position source 208

Position source selection may be based at least in part upon a previous determined position. For example, assume that a user of an electronic device 102 is at home. In this example, GPS coverage may not be available while the user is indoors. Through selection criteria such as historic position data 222 and/or LKP 126, the position subsystem 122 may determine that current position of the device is at home. Further, since the electronic device 102 may not be moving very far or often, position subsystem 122 may determine that accurate position determining is not critical. Accordingly, under these circumstances, the variety of selection criteria may cause position subsystem 122 to select cellular triangulation techniques instead of GPS techniques to determine position, and satellite navigation receiver 104 may be deactivated. Further, the frequency with which position is determined may also be adjusted. For example, instead of a continuous updates to position using GPS, the cellular triangulation techniques may be performed every minute, every five minutes and so forth. Alternatively, position subsystem 122 may select LKP 126 to provide position as an alternative to GPS or cellular triangulation.

Position source selection may be based at least in part on detected movement. Continuing the preceding example, assume now that the user gets in a car and begins driving away from home. Position subsystem 122 may now detect significant movement. Movement may be detected based upon cellular triangulation techniques or position determined through other position source 208. Position subsystem 122 may also detect the movement based on one or more inertial sensors 230. Accordingly, the position subsystem 122 may activate satellite navigation receiver 104 to begin receiving signal data 106 to determine position. However, if a GPS fix cannot be obtained, the position subsystem 122 may instead enable Wi-Fi triangulation. Likewise, if none of the position sources 208 are available, the position subsystem 122 may rely upon a stored LKP 126 as an alternative. In this manner, the electronic device 102 may anticipate changes and may initiate interactions with position sources 208 accordingly.

When the user in the foregoing example arrives at a destination, satellite navigation receiver 104 may still be active. The position subsystem 122 may observe through position determined by GPS and/or through inertial sensor 230 that the movement of the electronic device 102 has stopped for a defined period of time (e.g., 3 minutes, 5 minutes, and so forth.). At this time the position subsystem 122 may deactivate the satellite navigation receiver 104 to preserve battery power. Position subsystem 122 may also switch to a different position source 208 depending upon other selection criteria, such as switching to Wi-Fi or cellular triangulation. Further, while GPS was active to determine position, the position subsystem 122 may have stored data describing a last known position (LKP) 126. Accordingly, position subsystem 122 may use the LKP 126 as an alternative to determining position through position sources 208, so long as the LKP is determined to be valid. Further discussion of selectively using LKP 126 for position may be found in relation to the following figures.

Position source selection may further be based upon historic information collected over time that indicates position trends, routes, and identified patterns in the user's movement/behavior. The navigation device 202 may store such position history and patterns as position data 222 in a position database 220. For example, assume historic data is collected that indicates that navigation device 202 does not move from 11 PM to 7 AM (e.g., when the user is sleeping) and/or that the navigation device 202 does not move from 8 AM to 5 PM (when the user is at work). The position subsystem 122 may be configured accordingly to intelligently enable or disable one or more position sources 208 and corresponding position determining techniques according to historic data and patterns.

As should be appreciated, various configurations, combinations, and modifications of the described examples may be employed. A variety of additional examples of selecting a position source 208 according to various selection criteria are contemplated. For example, the position subsystem 122 of an electronic device 102 may deactivate GPS and utilize cellular techniques if the position subsystem 122 determines the electronic device 102 is stationary for a defined period of time. Further, the position subsystem 122 may deactivate GPS and utilize cellular techniques if the position subsystem 122 determines a speed that is less than a predetermined speed. The position subsystem 122 may also deactivate GPS and utilize Wi-Fi techniques if it determines that a Wi-Fi connection is available. The position subsystem 122 may further deactivate GPS and utilize cellular techniques if it determines that battery power of electronic device 102 is low. In another example, the position subsystem 122 may utilize an inertial sensor 230 such as an accelerometer to determine if the electronic device 102 is moving or otherwise being used to activate GPS or Wi-Fi methods. Still further, the position subsystem 122 may utilize historical position data, such as the user's travel habits and patterns, and activate or deactivate one or more position sources 208 and corresponding position determining techniques accordingly. In addition, the position subsystem 122 may vary the frequency at which it determines its position using one or more of the position sources 208.

The position subsystem 122 may perform the described position source selection techniques automatically and without prompting a user. The described position source selection techniques may be employed to increase the accuracy and/or continuity of position determined by the navigation device 202 while at the same time extending the battery life of the navigation device 202. In an implementation, the position subsystem 122 may output a prompt the user using its user interface before switching between position sources to inform the user and/or enable the user to confirm or prevent the switching.

Figure 4:
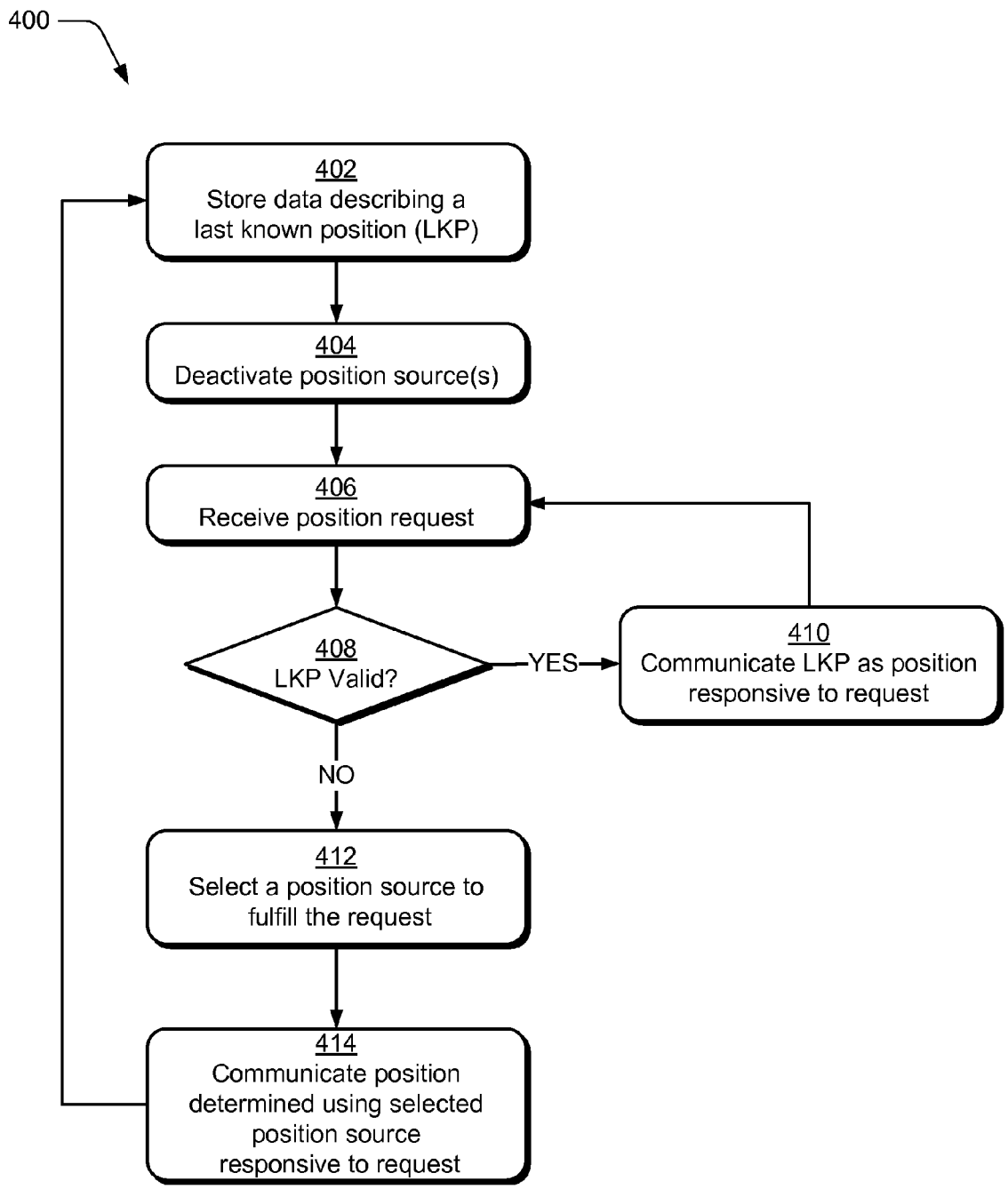
FIG. 4 is a flow diagram depicting an exemplary procedure in which a last known position may be stored and selected as an alternative to one or more positions sources.

FIG. 4 depicts a procedure 400 in an exemplary implementation in which a last known position is selectively employed for position dependent operations. A last known position is stored (block 402). For example, a last known position 126 may be stored in memory 206 of the navigation device 202. The last known position 126 may be determined through the one or more position sources 208. More particularly, the position subsystem 122 may be configured to update the LKP 126 using the various position determining techniques at times when corresponding position sources 208 are available to determine position. LKP 126 may be used to provide applications 124 with position information irrespective of a navigation device's 202 present ability to determine position using GPS or other techniques. For example, LKP 126 may be used to search POI data 224 indoors as the age and/or accuracy of position may not be critical to a POI search. Position subsystem 122 may the selectively use the stored LKP 126 when position sources 208 are unavailable; to provide a low latency position response when accurate position may not be critical; to conserve power of an electronic device 102; and so on.

Sometime after LKP is stored, position sources may be deactivated (block 404). For example position sources 208 may be deactivated to conserve power; when a corresponding navigation device 202 has been idle for a long time or is determined to be at an indoor location such as at "home", and so forth. Navigation device 202, and in particular position subsystem 122, may now be configured to use the stored LKP 126 as an alternative to using position sources 208 to determine position.

A position request is received (block 406). For example, position subsystem 122 may receive requests from the various device applications 124 to obtain position. Generally position may be provided by position subsystem 122 to enable position dependent functionality of the device applications 124. For the purposes of example here, assume that a browser 212 communicates a request to the position subsystem 122 to enable a position-based search of POI data 224 that may be maintained in position database 220. Specifically, a user may operate a browser 212 to initiate a search for movie theaters. Browser 212 may be configured to automatically use a current position to perform the search. In this example, position subsystem 122 may be configured to fulfill the request using the LKP 126, so long as the LKP 126 is valid.

Accordingly, the validity of LKP is determined (block 408). For example, position subsystem 122 may operate to ensure that stored LKP 126 has not expired or become incorrect due to change in position. This may include determining if the device has moved significantly (such as through inertial sensor 230) and/or if a defined amount of time has passed since the LKP 126 was stored. A LKP 126 may be stored with a timestamp, a validity period, or other suitable data to enable a determination of how long the LKP 126 has been stored. If too much movement is determined or too much time has passed, the LKP may be determined to be invalid. The determination of validity may also include assessing whether LKP 126 is sufficient to fulfill the request. For instance, a request from a navigation 216 application may specify criteria such as a level of accuracy or a particular position source 208 to be used. Accordingly, the LKP 126 may not be valid to fulfill the request if it does not meet specified criteria. However, in the preceding browser 212 search example, the LKP 126 may provide sufficiently accurate position for the purposes of the search.

When the last known position is valid, the last known position is communicated as position responsive to the request (block 410). Continuing the POI search example, the LKP 126 may be provided to the browser 212 application to perform the position dependent POI search. Additional requests may be handled in a like manner. When another request is received, procedure 400 returns to block 406. Position subsystem 122 may continue to provide LKP 126 in response to subsequent requests so long as the LKP 126 is determined to be valid in the determination made in block 408.

When the last known position is not valid, a position source is selected to fulfill the request (block 412). For instance, position source selection techniques and various selection criteria described with respect to procedure 300 of FIG. 3 may be employed to select a position source 208. For example, position subsystem 122 may select GPS satellites 108 to fulfill the request from navigation 216 application in the above example for which LKP 126 was determined to be invalid. Position may then be determined using the selected position source 208. The position determined using the selected position source is communicated responsive to the request (block 414). Position subsystem 122 may activate satellite navigation receiver 104 to receive signal data 106 from GPS satellites 108 to determine position. Position subsystem 122 may then communicate the determined position to the navigation 216 application in response to the position request. GPS satellites 108 may continue to determine position until selection criteria as discussed in FIG. 3 or other factors cause position subsystem 122 to select a different position source 208. Procedure 400 may return to block 402 where updated LKP 126 may be stored based on position determined through the selected position source 208. Thus, LKP 126 and a determination of the validity of LKP 126 may be used to both activate a satellite navigation receiver 104 in anticipation of user activity and/or to provide position dependent functions in the absence of GPS or other position sources 208.

Figure 5:
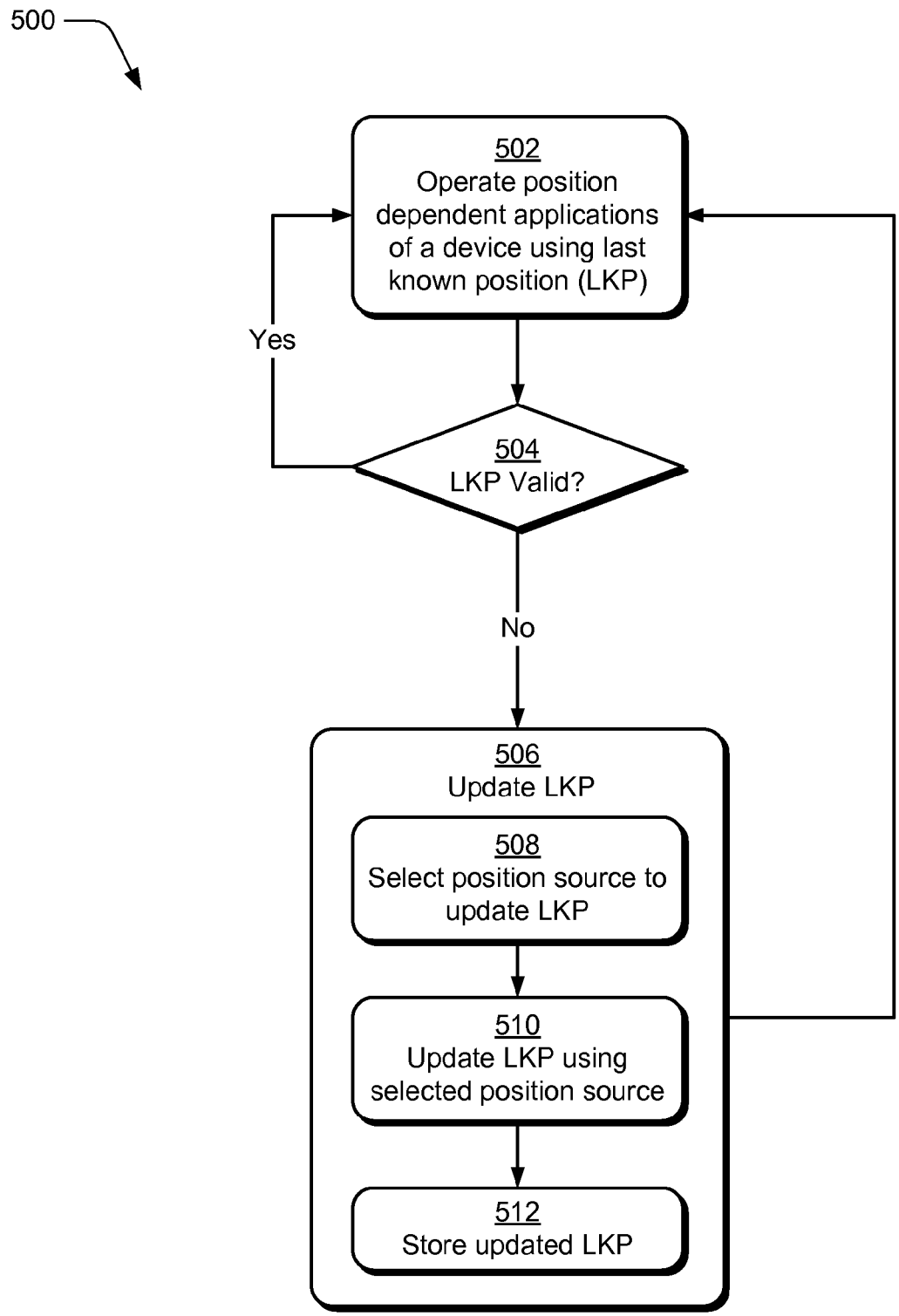
FIG. 5 is a flow diagram depicting an exemplary procedure in which a last known position may be updated.

FIG. 5 depicts a procedure 500 in an exemplary implementation in which a last known position is updated using one or more position sources. Position dependent applications of a device are operated using a last known position (block 502). For example, LKP 126 may be stored in memory 206 of a navigation device 202 through one or more position sources 208. LKP 126 may then be communicated as position to a requesting device application 124 as an alternative to the position sources 208, so long as the LKP 126 is valid as was discussed with respect to FIG. 4. Thus, the validity of the LKP is determined (block 504). When the LKP is valid, procedure 500 may return to block 502 where the device continues to uses the valid last known position 126 to operate position dependent applications. When LKP is determined to be invalid, an update to the LKP is initiated (block 506).

A variety of techniques are contemplated to check validity of the LKP 126. As previously discussed with respect to FIG. 4, position subsystem 122 may use a time stamp to determine if a validity period for LKP 126 has expired. In another example, movement of a navigation device 202 subsequent to storing LKP 126 may be used to determine the validity of a LKP 126. In other words, the position subsystem 122 may determine whether a corresponding navigation device 202 has moved in order to determine whether to perform an update to LKP 126. For instance, if significant motion, velocity and or other movement indicators are detected after the LKP 126 is stored, this may trigger an update to LKP 126. Inertial sensor 230 may be used to identify when a navigation device 202 has moved sufficiently to trigger an update to LKP 126. Significant motion could also be detected by using interactions of navigation device 202 with various position sources 208. For example, monitoring changes in identifiers of cellular tower and/or Wi-Fi access points encountered by a navigation device 202 may indicate significant motion of a navigation device 202

As illustrated in FIG. 5, an update to LKP 126 may further include selecting a position source to perform the update (block 508), determining position using the selected position source, (block 510) and storing the determined position as the updated LKP (block 512). For instance, position source selection techniques and various selection criteria as described with respect to procedure 300 of FIG. 3 may be employed to select a position source 208 that is used to perform an update to a stored LKP 126. Based on selection criteria, position subsystem 122 may select from among a variety of position sources 208 to perform the update. In an implementation, GPS satellites 108 and corresponding GPS techniques may be set as a default or primary way in which to update LKP 126.

Thus, when GPS is available, the last known position 126 is updated using GPS. Selection of GPS satellites 108 by position subsystem 122 to update LKP 126 may include activation of satellite navigation receiver 104.

When GPS is not available, the last known position 126 may be updated from an available position source 208 other than GPS. Of course, when there are no position sources 208 available, the last known position 126 may not be updated. In this case, a notification may be output to indicate to a user that a suitable position source 208 was not currently available and accordingly that the last known position 126 was not updated.

In a further embodiment, cached position data 222 may be employed to update LKP 126. As noted, position database 220 of a navigation device 202 may include position data 222 that relates identifiers of communication infrastructure elements to position. Examples of communication infrastructure include elements such as cellular towers, Wi-Fi access points, beacons, repeaters, routers, and/or other suitable communication infrastructure elements that may be detected/identified through operation of a navigation device 202. Suitable communications infrastructure elements generally have a fixed position. Thus, GPS techniques and/or other position sources 208 and techniques may be used to resolve a position that corresponds to various communication infrastructure elements. Position data 222 may be stored that relates determined positions to corresponding communication infrastructure elements and identifiers. Cellular towers, Wi-Fi access points, routers and other communication infrastructure elements typically have unique identifiers that may be obtained by a navigation device 202 when the navigation device encounters the communication infrastructure elements. Thus, the navigation device 202 may use the identifiers to relate the communication infrastructure elements to determined position. In particular, position subsystem may maintain a cache of communication infrastructure elements and corresponding position that are determined through GPS and/or other position sources 208 and position determining techniques. The cache may be stored locally on the navigation device 202 such as in position database 220.

In an implementation, a fixed number of positions related to corresponding cellular tower IDs, Wi-Fi access point IDs, or other identifiers of communication infrastructure elements may be maintained in the cache. For example, the number of the entries in the cache is may be predefined for example at 100, 500, 1000, and so forth. The entries may be maintained on a first in first out basis. Thus, the cache may maintain position relationships for communication infrastructure elements that are most frequently encountered by a navigation device 202.

Position subsystem 122 may use the cached position relationships to update LKP 126 as a navigation device 202 encounters various communication infrastructure elements. For example, when a cellular tower is detected, the corresponding position relationship may be retrieved from the cache and used to set LKP 126. LKP 126 may then be used as position when a request is received from a device application 124. In many cases, users travel on a few predefined routes for which position relationships to communication infrastructure elements encountered on the routes may be determined. Given that people travel along a few routes within similar geographic area every day (work, home, school, shopping, etc.), maintaining a number of position relationships for communication infrastructure to update LKP 126 may reduce queries to GPS. Even when a user travels to different areas (e.g., business travel or vacation), the user's moving pattern may be similar after the first day of arriving at the destination.

In operation, when a change of cell tower identifier (or other communication infrastructure element is detected), position subsystem 122 may respond by querying the cache for a position relationship to the cellular tower identifier. If a position relationship exists for the cell tower identifier in the cache, the position relationship may be used when position is requested by one or more device applications 124. In particular, the LKP 126 may be set based upon the position relationship.

If a position relationship does not exist for the cell tower identifier in the cache, the position subsystem 122 may proceed to determine a position using GPS or other position sources 208. Position subsystem 122 may then relate the determined position to the cell tower identifier and update the cache accordingly. Thus, not only may LKP 126 be employed while a device is relatively stationary, LKP 126 may also be beneficially employed while a navigation device 202 is in motion using cached position relationships as described. Storing a cache of position relationships of communication infrastructure elements may enable a satellite navigation receiver 104 to be deactivated more often, while still permitting position dependent functions. Thus, satellite navigation receiver 104 may be used less frequently which may further reduce power consumption and improve battery life.

Conclusion

Various techniques for position source selection have been described that may be implemented to take full advantage of the capabilities of an electronic device 102 and/or navigation device 202 to interact with a variety of position sources 208. Although techniques for position sources selection have been described in language specific to structural features and/or methodological acts, it is to be understood that the appended claims are not necessarily limited to the specific features or acts described. Rather, the specific features and acts are disclosed as exemplary forms of implementing the claimed devices and techniques for position source selection.

What is claimed is:

1. A navigation device, comprising:
a memory operable to store an application;
a satellite navigation receiver operable to receive signals from a first position source;
a communications module operable to receive signals from a second position source; and
a position subsystem in communication with the memory, satellite navigation receiver, and the communications module, the position subsystem operable to:
identify movement of the navigation device;
select one of the position sources based upon the identified movement;
determine position using the selected one of the position sources; and
communicate the determined position to an application stored in memory to perform a position dependent function.

2. A navigation device as recited in claim 1, wherein the position subsystem is further configured to:
store a last known position through interaction with the position sources;
determine validity of the last known position to perform the position dependent function; and
when the last known position is valid, communicate the last known position to the application instead of determining position through one of the position sources.

3. A navigation device as recited in claim 1, wherein the position subsystem is further configured to:

update a last known position stored on the navigation device when using the selected one of the position sources to determine position; and select the last known position as the determined position when one or more of the position sources are not available.

4. The navigation device as recited in claim 1, wherein the identified movement of the navigation device is a speed of the navigation device.

5. The navigation device as recited in claim 1, wherein:
the navigation device includes an inertial sensor; and
the position subsystem is operable to identify the movement of the navigation device using the inertial sensor.

6. The navigation device as recited in claim 1, wherein the position subsystem is operable to identify movement of the navigation device using at least one of the position sources.

7. The navigation device as recited in claim 6, wherein the position subsystem is operable to identify movement of the navigation device based on a communication infrastructure element associated with at least one of the position sources.

8. The navigation device as recited in claim 1, wherein the position subsystem is operable to identify movement of the navigation device based on an identification of a cellular tower associated with a cellular network.

9. The navigation device as recited in claim 1, wherein:
the first position source is a plurality of navigation satellites to communicate the signals received by the satellite navigation receiver; and
the second position source is a provider configured to communicate the signals received by the communication module over at least one of a cellular network and the Internet.

10. The navigation device as recited in claim 1, further comprising a battery, wherein the one of the position sources is selected to preserve the battery.

11. The navigation device as recited in claim 10, wherein the frequency of determining position is adjusted to preserve the power source.

12. The navigation device as recited in claim 9, wherein the position subsystem is further operable to determine a distance travelled by the navigation device and select one of the position sources based upon a movement threshold,
wherein the provider configured to communicate over at least one of a cellular network and the Internet is selected if the identified movement is below the movement threshold, and
wherein a plurality of navigation satellites are selected if the identified movement is above the movement threshold.

13. The navigation device as recited in claim 12, wherein the satellite navigation receiver is deactivated and the communication module is active when the provider configured to communicate over at least one of a cellular network and the Internet is selected.

14. The navigation device as recited in claim 12, wherein the communications module is deactivated and the satellite navigation receiver is active when the plurality of navigation satellites are selected.

15. The navigation device as recited in claim 13, wherein the position subsystem is further operable to determine if the navigation device is in proximity to a point of interest based on a last known position of the navigation device, wherein the communications module is selected if the last known position is associated with one of a home location or work location stored in memory.

16. The navigation device as recited in claim 1, wherein the position dependent function is one of indicating geographic position on a map, internet search, or providing navigation instructions and the memory includes a priority ranking for the position sources, wherein the position subsystem is further operable to select one of the position sources based upon the priority ranking.

17. The navigation device as recited in claim 1, wherein a last known position is provided to the application instead of the determined position.

* * * * *